United States Patent
Lee et al.

(10) Patent No.: US 8,645,980 B2
(45) Date of Patent: Feb. 4, 2014

(54) OPTICAL DEVICE AND ADJUSTING METHOD THEREOF

(75) Inventors: Hyun woo Lee, Suwon-si (KR); Hag Ryeol Kim, Suwon-si (KR); Sang Hun Kim, Suwon-si (KR); Hyouk Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/339,589

(22) Filed: Dec. 29, 2011

(65) Prior Publication Data

US 2012/0174139 A1    Jul. 5, 2012

(30) Foreign Application Priority Data

Dec. 31, 2010    (KR) ......................... 10-2010-0140626

(51) Int. Cl.
*G11B 17/02*    (2006.01)

(52) U.S. Cl.
USPC ........................................................ 720/696

(58) Field of Classification Search
USPC ......................................................... 720/696
See application file for complete search history.

(56) References Cited

U.S. PATENT DOCUMENTS

| | | | |
|---|---|---|---|
| 6,324,152 B1* | 11/2001 | Eguchi et al. | 720/697 |
| 6,633,532 B1* | 10/2003 | Handa | 720/675 |
| 6,667,945 B2* | 12/2003 | Omori | 720/681 |
| 6,807,672 B2* | 10/2004 | Kim | 720/700 |
| 2003/0081534 A1* | 5/2003 | Omori | 369/263 |
| 2005/0055706 A1* | 3/2005 | Omori et al. | 720/700 |

* cited by examiner

*Primary Examiner* — Mark Blouin
(74) *Attorney, Agent, or Firm* — NSIP Law (57) ABSTRACT

An optical device and method are provided including a spindle motor mounted in a turn table on which an optical disk is attached and detached. The optical device includes a bracket secured with a stator of the spindle motor. The optical device also includes a tray body directly connected to the bracket. A skew angle of the spindle motor is adjusted while the bracket is assembled to the tray body, and an adjusting method of the optical device.

24 Claims, 7 Drawing Sheets

600
810
630
820
PORTION WHERE EXTERNAL
FORCE IS APPLIED
800

FIG. 7

OPTICAL DEVICE AND ADJUSTING METHOD THEREOF

CROSS-REFERENCE TO RELATED APPLICATION

This application claims the benefit under 35 U.S.C. §119(a) of Korean Patent Application No. 10-2010-0140626. The subject matter of the earlier filed application is hereby incorporated by reference.

BACKGROUND

1. Field

The following description generally relates to an optical device recording or reproducing data on an optical device and an adjusting method thereof.

2. Description of the Related Art

In general, an optical disk refers to CD (Compact Disc)-ROM, CD-R, CE-RW, DVD (Digital Versatile Disc)-ROM, DVD-R, DVD-RW, and a recently-developed format of AVCHD, HD-DVD, and a Blu-ray Disc® using a bluish-violet laser light capable of higher density recording than the above optical discs, such as BD-R and BD-RE.

Data is recorded or reproduced on the optical disk by an optical pickup including a laser diode as a light emitting source, a photo diode as a light receiving source, a diffraction grating forming a light path between the light emitting source and the light receiving source, a sensor lens, a mirror, and an objective lens.

In the objective lens of the optical pickup, a focusing servo control is performed on a perpendicular direction of the optical disk, and a tracking servo control is performed on a circumferential direction of the optical disk. In the optical pickup, a track is traced, along a track formed along a circumferential direction of the optical disk, to input and output an optical signal corresponding to a pitch shape of a particular track.

The optical disk placed on a tray is loaded on or unloaded from an optical device, and rotated by a spindle motor. The optical pickup is connected to a feed motor to linearly move to a radial direction of the optical disk along a guide rod. The spindle motor includes a stator wound with a coil and fixed to a bracket, and a rotor mounted with a magnet generating an electromagnetic force by interacting with the stator.

In many instances, a problem may occur on a tracking servo or a focusing servo, if a skew angle, which is an angle of inclination or tilt angle (hereinafter referred to as tilt angle) of a rotation shaft in the spindle motor is twisted.

SUMMARY

The present disclosure has been made to solve the foregoing problem and, therefore, certain configurations or aspects described herein are to provide an optical device configured to adjust a skew angle of a spindle motor within a range to access an inner periphery and an outer periphery of an optical disk at a same condition and an adjusting method thereof.

In order to achieve at least the above purpose, in whole or in part, and in accordance with the purposes of the disclosure, as illustrated and broadly described, and in one general aspect, there is provided an optical device, including a spindle motor configured to be mounted in a turn table on which an optical disk is attached and detached. The optical device includes a bracket configured to be secured with a stator of the spindle motor. The optical device further includes a tray body configured to be directly connected to the bracket, wherein a skew angle of the spindle motor is adjusted by applying an external force to the bracket.

In accordance with an aspect, an adjusting method of an optical device, includes securing a stator of a spindle motor on a tray body. The method also includes adjusting a skew angle of flatness of a bracket or a spindle motor while the bracket and one or more guide rods guiding a linear movement of an optical pickup are directly connected to the tray body.

FIG. 1 illustrates an alternative E-architecture in the 3GPP TR 23.882 version 1.12-0, in accordance with an embodiment of the present invention.

In accordance with an alternative aspect, there is provided an adjusting method of an optical device, including directly connecting a bracket on which a stator of a spindle motor is fixed and one or more guide rods guiding a linear movement of an optical pickup to a tray body. The method also includes selecting at least three reference points relative to the one or more guide rods to set-up a reference plane including the reference points. The method further includes measuring flatness of the bracket relative to the reference plane or a skew angle of the spindle motor. The method includes deforming the bracket by applying an external force to the bracket until a measurement value comes within a range.

In accordance with an aspect, an optical device, includes a spindle motor configured to be mounted in a turn table on which an optical disk is attached and detached. The device includes a bracket configured to be secured with a stator of the spindle motor. The device further includes a tray body configured to be directly connected to the bracket. A skew angle of the spindle motor is adjusted by applying an external force to a surface of the bracket until a tilt angle of a measuring plane relative to a reference plane is within a range.

BRIEF DESCRIPTION OF THE DRAWINGS

The accompanying drawings, which are included to provide a further understanding of the disclosure and are incorporated in and constitute a part of this application, illustrate example(s) of the disclosure, and together with the description serve to explain the principle of the disclosure. In the drawings.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that when an element or layer is referred to as being "on," "connected to" or "coupled to" another element or layer, it can be directly on, operatively connected or coupled, or connected or coupled to the other element or layer or intervening elements or layers. In contrast, when an element is referred to as being "directly on," "directly connected to" or "directly coupled to" another element or layer, there are no intervening elements or layers present. Like numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. As may be used herein, the terms "substantially" and "approximately" provide an industry-accepted tolerance for its corresponding term and/or relativity between items.

Descriptions of well-known components and processing techniques are omitted so as to not unnecessarily obscure the various configurations of the disclosure.

Hereinafter, structure of an optical device to easily adjust a skew angle and an adjusting method thereof according to the present configuration will be described in detail with reference to the accompanying drawings.

Figure 1:
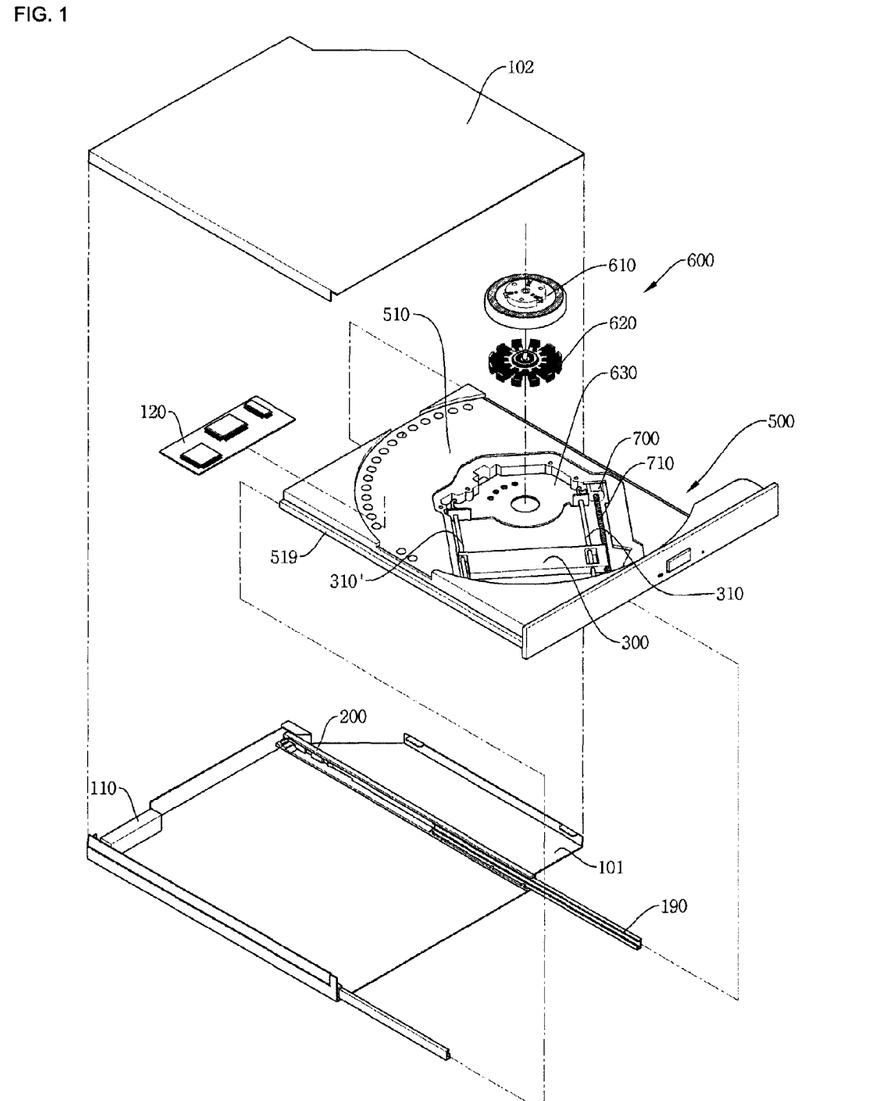
FIG. 1 is an exploded perspective view illustrating an optical device, according to an illustrative example.

FIG. 1 is an exploded perspective view illustrating an optical device, according to an illustrative example. Referring to FIG. 1, an optical device includes an upper case (102), a bottom case (101), a main PCB (printed circuit board, 120), a tray unit (500), a spindle motor (600) and a feed motor (700).

The bottom case (101) is connected to a notebook computer or other multimedia device, and is provided with an interface connector (110). The interface connector (110) is connected to the main PCB (120). The bottom case (101) is provided with the case guide (200) guiding a sliding of the tray unit (500) and is also provided with an intermediate guide (190) connected to the case guide (200). The upper case (102) is fastened to the bottom case (101) to tightly seal the optical device.

The spindle motor (600) includes a stator (620) wound with a coil and a rotor (610) mounted with a magnet for generating an electromagnetic force by interacting with the stator (620). The stator (620) may be press-fitted into a bracket (630) or by bonding method, whereby the spindle motor (600) is secured to the bracket (630).

An optical pickup (300), reading an optical signal reflected from an optical reflective surface of an optical disk, is guided in linear movement thereof along with at least one or more guide rods (310, 310'), and receives a driving force through the feed motor (700) and a lead screw (710). As illustrated, a guide rod (310) is respectively provided at each of left and right sides of the optical pickup (300).

The main PCB (120) includes therein a motor driving chip controlling drive of the spindle motor (600) and the feed motor (700), an optical pickup controller controlling operation of the optical pickup (300) and signal input/output, a Serial Advanced Technology Attachment (SATA) interface controller, and a circuit controlling other operations of the optical device. In some illustrative examples, the main PCB (120) may be mounted at a bottom surface of the tray body (510) to move along with the tray body (510).

Both distal ends of the tray body (510) may be protrusively formed with a tray guide (519). The tray guide (519) may be inserted into the intermediate guide (190) or the case guide (200) to guide the movement of the tray body (510).

The tray unit (500) may include the tray body (510) placed with the optical disk and the bracket (630). In an illustrative example, the bracket (630) and the tray body (510) may be integrally formed and it may be possible to adjust a skew angle of spindle motor (600) by adjusting flatness of the bracket (630), while the tray body (510) and the bracket (630) are integrally assembled.

In one example, the bracket (630) and the tray body (510) may be made of different materials, the materials including, but not limited to, plastic, resin, polyurethane materials, or aluminum. For example, the bracket (630) may be made of metal, for example, aluminum, and the tray body (510) may be made of a synthetic resin. In this case, the bracket (630) may be directly connected to the tray body (510), and the stator (620) of the spindle motor (600) may be secured to the bracket (630) integrally formed with the tray body (510).

In another example, the bracket (630) and the tray body (510) may be made of same materials. In this instance, the bracket (630) would be simply a part of the tray body (510), whereby a part of the tray body (510) becomes the bracket (630). In this case, the stator (620) may be directly secured to a position corresponding to the bracket (630) which is a part of the tray body (510).

Furthermore, in a configuration in which a deck is provided as a separate element and the deck is assembled by the spindle motor (600), even if a skew angle of the spindle motor (600) is within a standard or allowable range in a subcomponent state of the spindle motor (600), the skew angle of the spindle motor (600) may be twisted in transit. In the alternative, in a multistage assembly process relative to the tray body (510) and the spindle motor (600), even if a skew angle of the spindle motor (600) is within a standard or allowable range in a subcomponent state of the spindle motor (600), the skew angle of the spindle motor (600) may be twisted in transit. Therefore, a complicated quality control system may be caused that calls for management of skew angle in various work processes.

To overcome these problems, in accordance with an illustrative example, the bracket (630) may be configured to be directly connected to and integrally formed with the tray body (510), in which a separate element connecting the bracket (630) and the tray body (510) is dispensed with. Thus, the assembly process may be simplified, the number of parts may be reduced, and management of skew angle of the spindle motor may be simplified.

Figure 2:
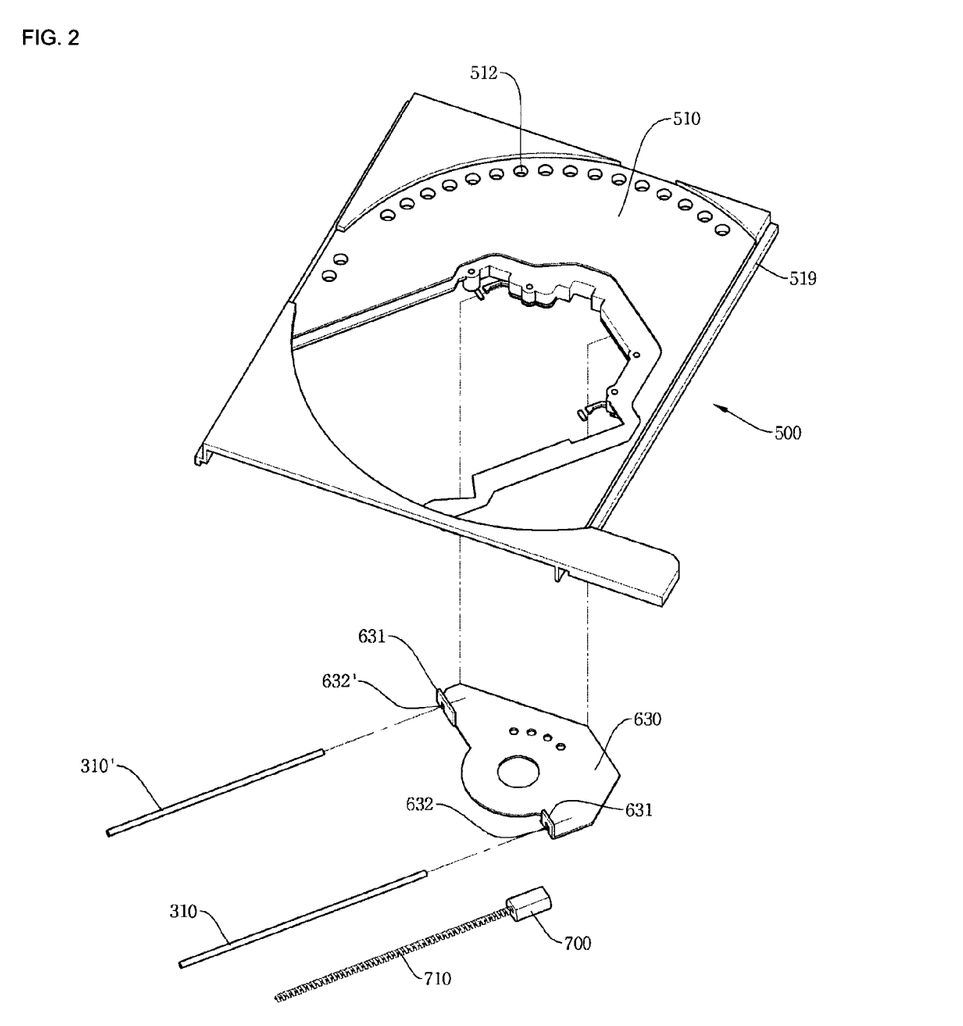
FIG. 2 is an exploded perspective view illustrating a tray unit, according to an illustrative example.

FIG. 2 is an exploded perspective view illustrating a tray unit, according to an illustrative example. FIG. 2 illustrates the bracket (630) being separated from the tray body (510). In one example, the bracket (630) and the tray body (510) may be provided with different materials. The bracket (630) and the tray body (510) provided with different materials may be directly connected and integrally formed by using various methods. Furthermore, the guide rods (310, 310') guiding the linear movement of the optical pickup (300) may be directly connected to and integrally formed with the tray body (510). The feed motor (700), as a driving source linearly moving the optical pickup (300), and the lead screw (710) may be directly connected to and integrally formed with the tray body (510). For example, where the bracket (630) and the tray body (510) are made up of different materials, the bracket (630), for example, made of metal, may be directly connected to the tray body (510), for example, made of resin, by insert molding, UV bonding, forced putting-in, caulking a boss (the boss being set in a hole of the bracket) protruded in a back side of the tray body in high temperature, caulking a bumped portion of the bracket against the tray body, welding, or any combination thereof. Where the bracket (630) and the tray body (510) are made up of same materials, for example, resin, the bracket (630) may be directly connected to the tray body (510) by resin molding, bonding, forced putting-in, caulking, welding, or any combination thereof.

Thus, one or more of the bracket (630) securing the spindle motor (600), the guide rods (310, 310') guiding the linear movement of the optical pickup (300), the feed motor (700) linearly driving the optical pickup (300) and the lead screw (710) may be directly connected to the tray body (510).

In a case the guide rods (310, 310'), the feed motor (700) and the lead screw (710) are integrally provided with the tray body (510), a reference plane (800) to adjust the skew angle of the spindle motor (600) may be accurately set-up. In an illustrative example, when a flatness of the bracket (630) relative to a reference plane (800) or a skew angle of the spindle motor (600) is measured, and an external force is applied to particular positions (m1~m4) of the bracket (630) to locally deform the bracket (630), the adjustment of skew angle of the spindle motor (600) may be completed in the same single process.

Figure 3:
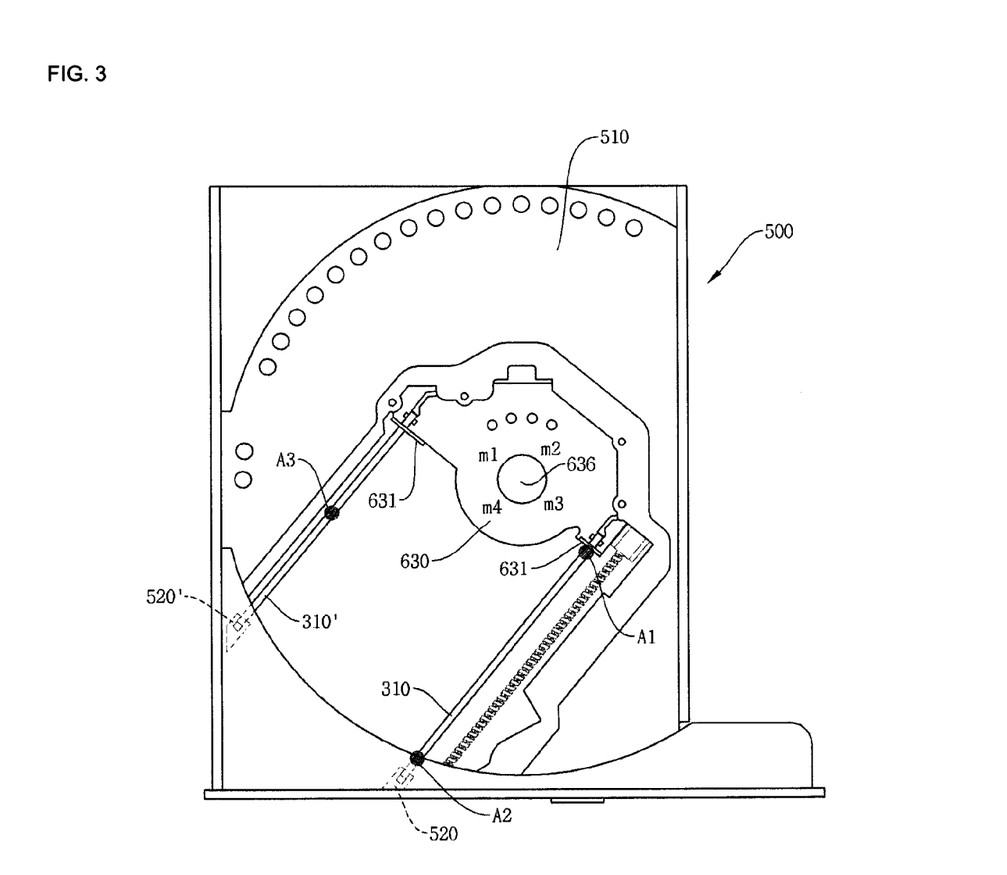
FIG. 3 is a plane view illustrating the tray unit, according to an illustrative example.
Figure 4:
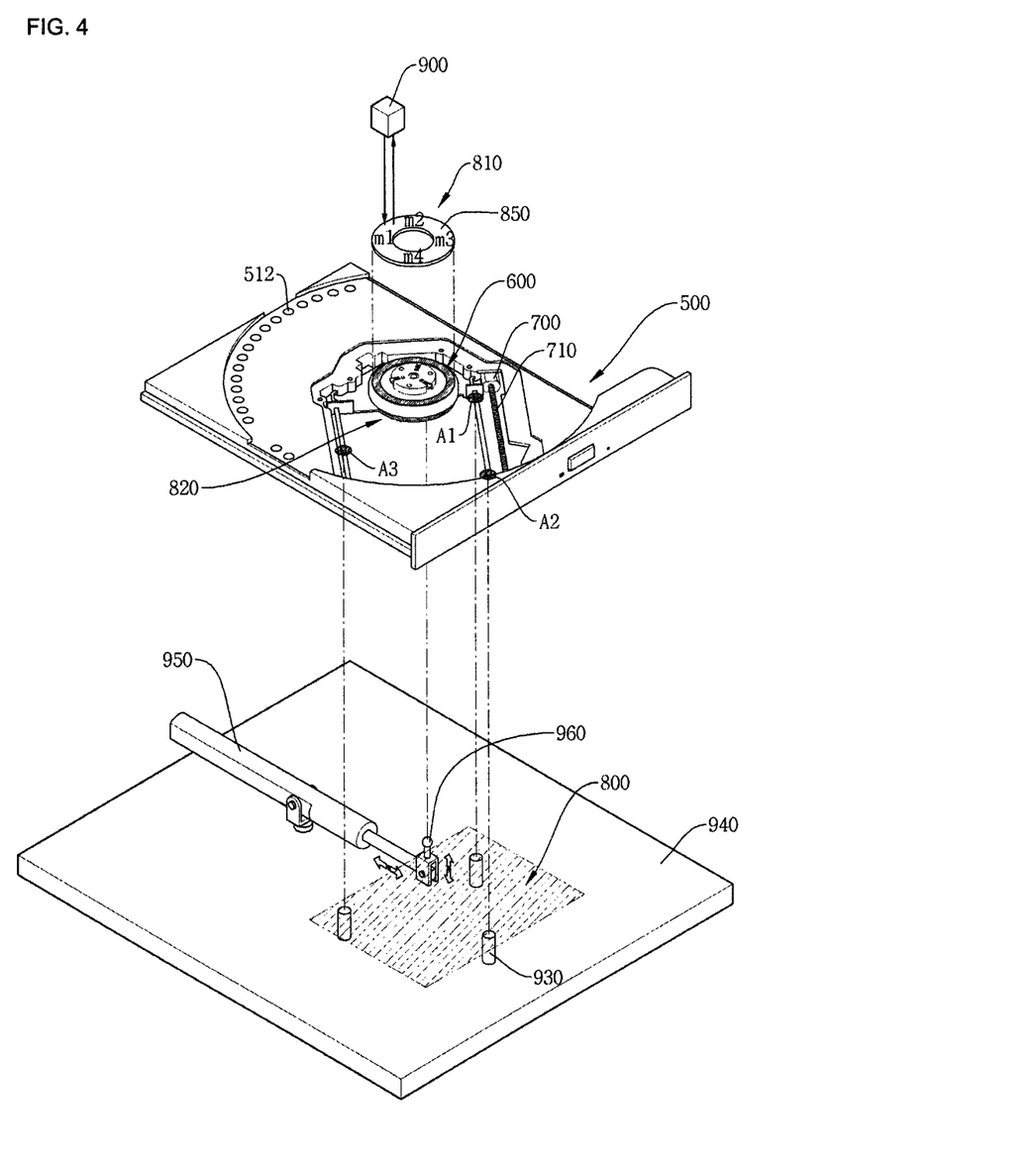
FIG. 4 is a perspective view illustrating an adjusting method of the optical device, according to an illustrative example.
Figure 5:
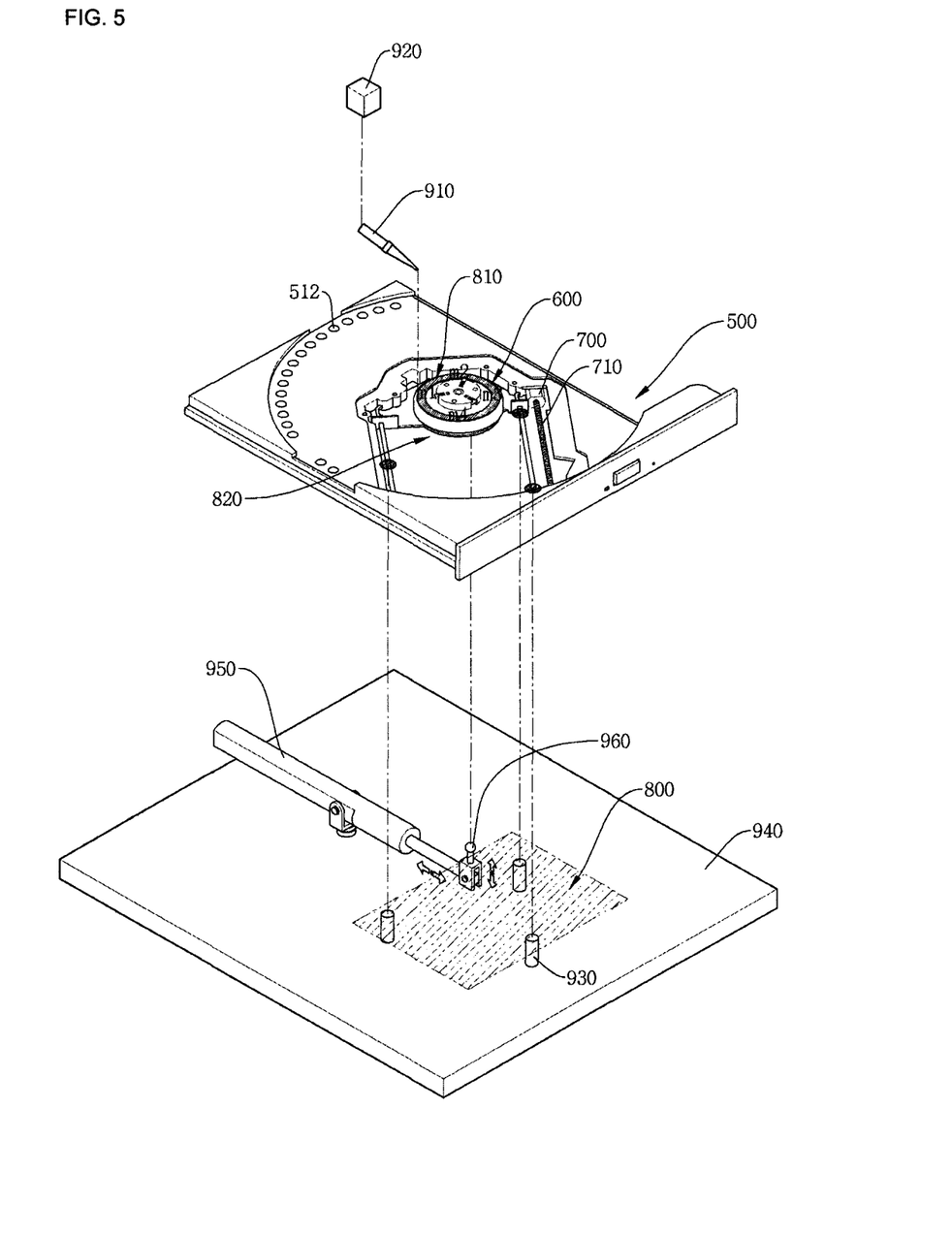
FIG. 5 is a perspective view illustrating an adjusting method of the optical device according to another illustrative example.
Figure 6:
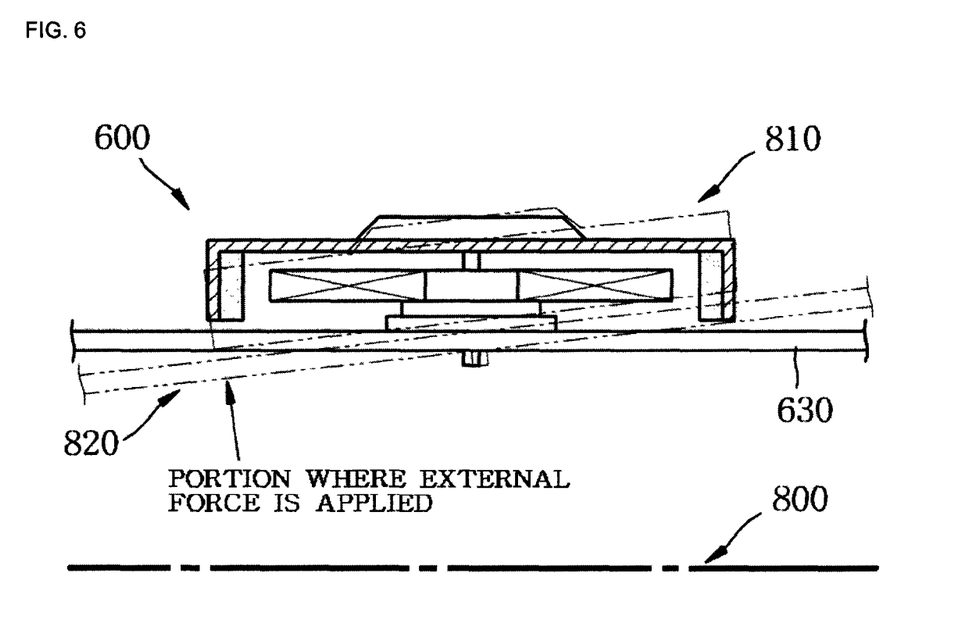
FIG. 6 is a lateral view illustrating a reference plane, a measuring plane, and an adjustment surface of the optical device, according to an illustrative example.

FIG. 3 is a plane view illustrating a tray unit, according to an illustrative example. FIG. 4 is a perspective view illustrating an adjusting method of the optical device, according to an illustrative example. FIG. 5 is a perspective view illustrating an adjusting method of the optical device, according to an illustrative example. FIG. 6 is a lateral view illustrating a reference plane, a measuring plane and an adjustment surface of the optical disk, according to an illustrative example.

A skew angle adjusting method of an optical device can be learned with reference to FIGS. 3 to 6.

In an illustrative example, the bracket (630), the guide rod (310), and the feed motor (700) and the lead screw (710) may be directly connected to the tray body (510) depending on exemplary configurations. Thus, because the skew angle adjustment of the spindle motor (600) may be provided in the tray body (510) unit assembled with these elements, the skew angle adjustment of the spindle motor (600) simultaneously with the skew angle measurement may be completed in a single process without going through several skew angle adjustment processes.

In one example, when the bracket (630) is substantially parallel relative to the reference plane (800), the rotation shaft of the spindle motor (600) may be perpendicular to the reference plane (800). In this example, the skew angle of the spindle motor (600) may be distributed within a standard or allowable range. Therefore, a reference plane (800) is set-up. A comparison is made as to whether a measuring plane (810) is substantially parallel to the reference plane (800), and an external force is applied to the bracket until the reference plane (800) and the measuring plane (810) become substantially parallel. As a result, the skew angle adjustment of the spindle motor is completed.

A one plane may be determined by at least three points. Accordingly, the reference plane (800) to adjust and measure the skew angle may be determined by at least three reference points. The at least three reference points may be selected from factors determining position of the optical pickup (300) or from factors determining the flatness of the tray body (510). Therefore, the reference points may be selected from mutually different positions of the tray body (510), or from three or more mutually different positions selected along the guide rods (310, 310') or from three or more mutually different positions along the lead screw (710).

Thus, in some examples, the at least three reference points may be selected along the guide rods (310, 310') or the lead screw (710) because the guide rods (310, 310') or the lead screw (710) may define a spatial position or a skew angle of the optical pickup (300). The skew angle of the spindle motor (600) may be determined by a relative position between the optical pickup (300) and the spindle motor (600) or a tilt angle.

Referring to FIGS. 2 and 3, in a case a pair of guide rods (310, 310') including a first guide (310) and a second guide rod (310') is provided, a distal end of the first guide (310) may be inserted into a guide rod hole (632) positioned at the bracket (630), and the other distal end of the first guide rod (310) may be inserted into a fixture (520) provided at the tray body. The guide rod holes (632, 632') may be formed on a bending unit (631) formed by bending a part of the bracket (630).

A distal end of the second guide rod (310') may be inserted into the guide rod hole (632') positioned at the bracket (630), and the other distal end of the second guide rod (310') may be inserted into a fixture (520') provided at the tray body.

In some illustrative examples, a first reference point (A1) is positioned at the distal end of the first guide rod (310) adjacent to the guide rod hole (632), a second reference point (A2) is positioned at the other distal end of the first guide rod (310) adjacent to the fixture (520), and a center portion of the second guide rod (310') is positioned with a third reference point (A3). A flat surface determined by the first, second and third reference points (A1, A2, A3) is set-up as the reference plane (800).

Also, in some examples, a center portion of the first guide rod (310) may be set-up as the third reference point (A3), both distal ends of the second guide rod (310') may be set-up as the first reference point (A1) and the second reference point (A2), and the first, second and third reference points (A1, A2, A3), thus, set-up as factors may set-up the reference plane (800).

Furthermore, in some examples, in a configuration in which only the second guide rod (310') is provided, a distal end of the optical pickup (300) may be coupled to the second guide rod (310') and the other distal end of the optical pickup (300) may be coupled to the lead screw (710). At this time, the first and second reference points (A1, A2) may be set-up along the second guide rod (310'), the third reference point (A3) may be set-up along the lead screw (710), and the reference plane (800) may be set-up with the first, second, and third reference points (A1, A2, A3) as factors.

A person of ordinary skill in the art would appreciate that the first and second reference points (A1, A2) may be set-up along the lead screw (710), the third reference point (A3) may be set-up along the second guide rod (310'), and the reference plane (800) may be set-up with the first, second, and third reference points (A1, A2, A3) as factors.

Although the reference plane (800) may be set-up based on three reference points, as described above, four reference points may be set-up at both distal ends of the pair of guide rods (310, 310'), based on which the reference plane (800) may be set-up. In the alternative, four reference points may be set-up at the guide rod (310') and both distal ends of the lead screw (710), based on which the reference plane (800) may be set-up.

In one illustrative example, three reference points may define sufficient conditions to define one plane, such as the reference plane (800), so that there is no need of error correction. Meanwhile, in case of setting-up the reference plane (800) using four or more reference points, an average of coordinate values may be calculated to set-up the reference plane (800).

In one example, the skew angle of the spindle motor (600) relative to the reference plane (800) may be determined by any one of the following: a parameter of flatness of bracket (630) relative to the reference plane (800), a parallelism of bracket (630) relative to the reference plane (800), a flatness of the spindle motor (600) relative to the reference plane (800), a parallelism of the spindle motor (630) relative to the reference plane (800), a flatness of turn table (860) relative to the reference plane (800), a parallelism of the turn table (860) relative to the reference plane (800), a flatness of the optical disk relative to the reference plane (800), and a parallelism of a dummy disk (850) relative to the reference plane (800).

The flatness of bracket (630), spindle motor (600), turn table (860) and the dummy disk (850) relative to the reference plane (800) or the parameters on the parallelism are physically the same parameters when viewed from a target to adjust the skew angle of the spindle motor (600).

The flatness of bracket (630) may be measured by at least three measurement points on surface of bracket (630), and the parallelism of the spindle motor (600) may be measured by at least three measurement points on surface of spindle motor (600) or turn table (860).

In case of measuring a coordinate using the optical sensor (900), in one example, the dummy disk (850) having an optical reflective surface may be mounted on the turn table (860), and the flatness of the dummy disk (850) may be measured by at least three measurement points on the surface of dummy disk.

The skew angle of the spindle motor (600) relative to the reference plane (800) is a tilt angle of the measuring plane (810) relative to the reference plane (800). The measuring plane (810) may be determined by at least three measurement points (m1, m2, m3, m4). When the tilt angle of the measuring plane (810), relative to the reference plane (800), is within an allowable range, the skew angle of the spindle motor (600) is within the allowable range. When the tilt angle of the measuring plane (810), relative to the reference plane (800), is out of or deviated from the allowable range, an external force may be applied to the bracket (630) to adjust the flatness of bracket (630). In one example, when an adjustment surface (820) is defined by a surface deformed by action of the external force, the adjustment surface (820) is a rear surface of the bracket (630).

In another example, when the adjustment surface (820) of the bracket (630) is plastic-deformed with respect to the reference plane (800), a tilt angle of the measuring plane (810) is measured relative to the reference plane (800) and an external force is applied to the adjustment surface (820) until the tilt angle comes within the allowable range. As a result, the adjustment of skew angle of the spindle motor (600) can be completed with one single process. For instance, supporters (930) contacting the at least three reference points (A1, A2, A3) may be protruded from an adjustment jig (940), and the tray body (510) may be mounted on the adjustment jig (940), whereby the reference plane (800) is set-up. The reference plane (800) may be a plane including reference points and contact points of the supporters (930).

The at least three or more measurement points (m1, m2, m3, m4) may be selected on any one surface of the bracket (630), the turn table (860), and/or the dummy disk (850), each coordinate value of the measurement points (m1, m2, m3, m4) relative to the reference plane (800) may be measured by the optical sensor (900) in non-contacting or contactless method, or measured by a probe (910) in contact method. A measurement value of the probe (910) is displayed on a display unit (920), whereby the tilt angle of the measuring plane (810) relative to the reference plane (800) can be measured.

When the tilt angle of the measuring plane (810) relative to the reference plane (800) is within an allowable range, the product is regarded as a good one. The tilt angle of the measuring plane (810), relative to the reference plane (800), is considered to be outside the allowable range when the skew angle of the spindle motor (600) or the flatness of the bracket (630) deviates from the allowable range. The bracket (630) is plastic-deformed by applying an external force to the surface of the bracket (630), which is the adjustment surface (820) until the tilt angle of the measuring plane (810) relative to the reference plane (800) comes into within the allowable range.

The external force is activated by a lever (950). A boss (960) is provided on a distal end of the lever (950) and is position-adjustable to lengthwise and vertical directions of the lever (950). When the lever (950) is depressed, the boss (960) ascends to apply the external force to a particular position at a rear surface of the bracket.

In an illustrative example, where the external force is applied by depressing the rear surface of the bracket (630) downwards, the position to which the external force is applied by the ascent of the boss (960) is a measurement point where a height coordinate value is minimum relative to the reference plane (800).

The optical device and adjusting method thereof, according to an illustrative example, has an industrial applicability in that a bracket may be directly connected to and integrally formed on a tray body to reduce the number of parts connecting the bracket and the tray body, and to simplify a quality control management system. The bracket and the tray body may be integrally provided to simplify a fastening job of fastening a spindle motor to the tray body and to ease a quality control management. A skew angle of the spindle motor may be adjusted by a simple adjustment of flatness of bracket, while the bracket and the tray body are integrally provided to reduce the number of processes, for skew angle adjustment. Such configuration enables an improvement in adjustment accuracy because the skew angle adjustment is performed under an assembled state.

Figure 7:
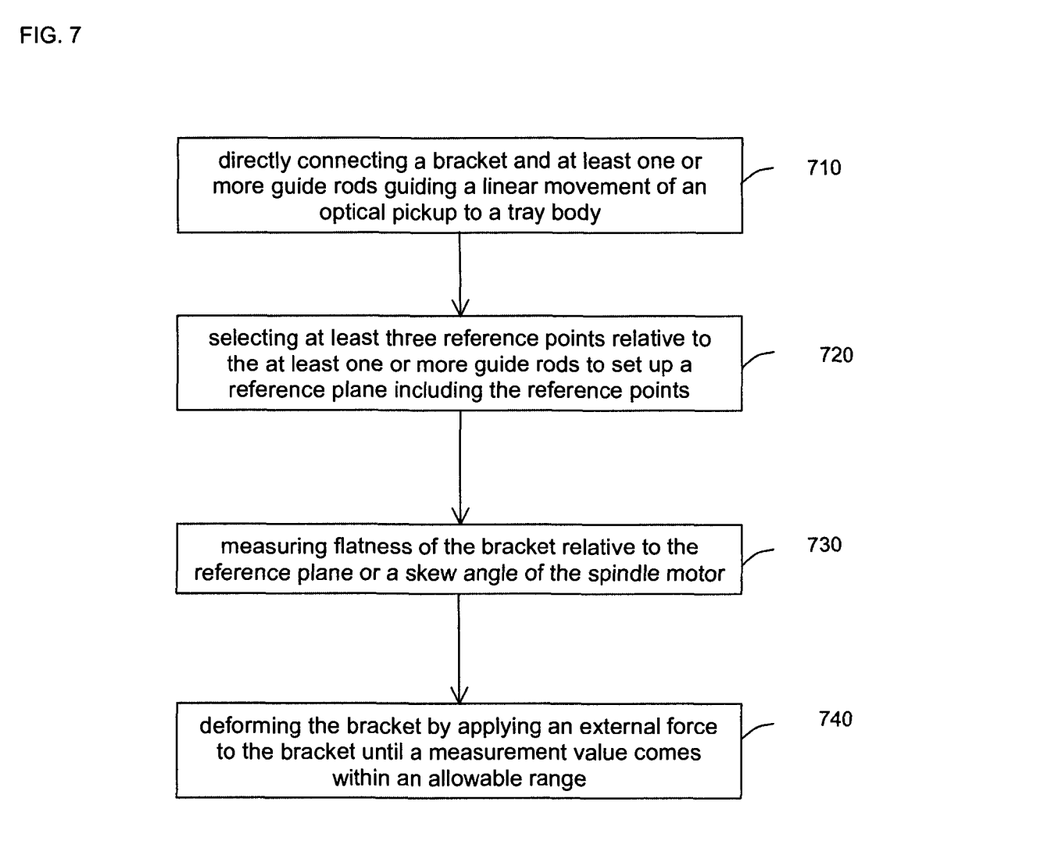
FIG. 7 illustrates an adjusting method of an optical device, in accordance with an illustrative example.

FIG. 7 illustrates an adjusting method of an optical device, in accordance with an illustrative example. The method includes directly connecting (710) a bracket (630) on which a stator of the spindle motor (600) is fixed and at least one or more guide rods (310, 310') guiding a linear movement of an optical pickup (300) to a tray body (510). The method further includes selecting (720) at least three reference points relative to the one or more guide rods (310, 310') to set-up a reference plane including the reference points. The method further includes measuring (730) flatness of the bracket (630) relative to the reference plane or a skew angle of the spindle motor (600). The method further includes deforming (740) the bracket (630) by applying an external force to the bracket (630) until a measurement value comes within an allowable range.

It is to be understood that in the embodiment of the present invention, the operations in FIG. 7 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIG. 7.

Program instructions to perform a method described in FIG. 7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical device, comprising:
   a spindle motor configured to be mounted in a turn table on which an optical disk is attached and detached;
   a bracket configured to be secured with a stator of the spindle motor; and
   a tray body configured to be directly connected to the bracket, wherein a skew angle of the spindle motor is adjusted by applying an external force directly to the bracket.

2. The optical device of claim 1, wherein
   a reference plane is set-up by at least three reference points selected from mutually different positions of the tray body,
   a measuring plane is determined by at least three measurement points selected on mutually different positions of the turn table or by at least three measurement points selected on mutually different positions of the bracket, and
   the skew angle of the spindle motor is adjusted by applying the external force, which adjusts flatness of the measuring plane relative to the reference plane or a tilt angle of the measuring plane relative to the reference plane within a range.

3. The optical device of claim 1, wherein the optical device comprises one or more guide rods coupled to the tray body to guide a linear movement of an optical pickup, wherein at least three reference points are selected relative to the one or more guide rods and a reference plane is set-up by the reference points, and the skew angle of the spindle motor relative to the reference plane is adjusted by the external force applied to the bracket.

4. The optical device of claim 1, further comprising:
   one or more guide rods configured to be coupled to the tray body to guide a linear movement of an optical pickup;
   a feed motor configured to be coupled to the tray body to linearly move the optical pickup; and
   a lead screw configured to be operatively connected to the feed motor, wherein at least three reference points are selected relative to the guide rod or the lead screw and a reference plane is set-up by the reference points, and the skew angle of the spindle motor relative to the reference plane is adjusted by the external force applied to the bracket.

5. The optical device of claim 1, further comprising:
   first and second guide rods coupled to the tray body to guide a linear movement of an optical pickup, wherein
      a distal end of the first guide rod is set-up as a first reference point, the other distal end of the first guide rod is set-up as a second reference point, a center portion of the second guide rod is set-up as a third reference point, a reference plane including the first, second, and third reference points is set-up, and the skew angle of the spindle motor is adjusted by applying the external force, which adjusts flatness of the bracket relative to the reference plane or a tilt angle of the turn table within a range.

6. The optical device of claim 1, wherein
   a reference plane is set-up by at least three reference points selected from mutually different positions of the tray body,
   a measuring plane is determined by at least three measurement points selected on mutually different positions of the turn table or by at least three measurement points selected on mutually different positions of the bracket, and
   the external force is applied to the bracket at a measurement point position where a height coordinate value is minimum relative to the reference plane, and the skew angle of the spindle motor is adjusted by plastic deformation of the bracket.

7. The optical device of claim 1, wherein a reference plane relative to the tray body is set-up, a measuring plane is determined relative to one of the turn table, a dummy disk mounted on the turn table and the bracket, and the skew angle of the spindle motor is adjusted by plastic-deforming the bracket by applying an external force until flatness of the measuring plane relative to the reference plane comes into a range.

8. The optical device of claim 7, wherein the dummy disk includes an optical reflective surface, and a coordinate value of the dummy disk relative to the reference plane is measured by an optical sensor using a contactless method.

9. The optical device of claim 7, wherein the measuring plane is determined by at least three measurement points, and a coordinate value of the measurement point relative to the reference plane is measured by a probe contacted by one of the turn table, the dummy disk, and the bracket.

10. The optical device of claim 1, wherein the stator is mounted on one side of the bracket and the skew angle of the spindle motor is adjusted by the external force applied to another side of the bracket.

11. The optical device of claim 10, wherein a boss protruded from a distal end of a lever depresses the other side of the bracket to apply the external force to the bracket, and the boss moves to an arbitrary position at an arbitrary height in response to linear movement and rotation movement of the lever.

12. An adjusting method of an optical device, the method comprises:
securing a stator of a spindle motor on a tray body; and
adjusting a skew angle of flatness of a bracket or a spindle motor while the bracket and one or more guide rods guiding a linear movement of an optical pickup are directly connected to the tray body, and the bracket supports the spindle motor.

13. The adjusting method of claim 12, further comprising:
coupling a feed motor, linearly moving the optical pickup, and a lead screw, connected to the feed motor, to the tray body to select at least three reference points relative to the guide rod or a lead screw, wherein the reference points are respectively brought into contact with a supporter of an adjustment jig;
setting-up a reference plane to include the reference points and a contact point of the supporter;
measuring flatness of the bracket relative to the reference plane or the skew angle of the spindle motor; and
plastic-deforming the bracket by applying an external force to the bracket until the flatness of the bracket or the skew angle of the spindle motor is within a range.

14. The adjusting method of claim 13, further comprising:
mounting a dummy disk including an optical reflective surface on a turn table of the spindle motor; and
using an optical sensor to read an optical signal reflected from the optical reflective surface to measure the flatness of the bracket or the skew angle of the spindle motor.

15. The adjusting method of claim 13, further comprising:
using a probe contacted by one of a dummy disk mounted on a turn table of the spindle motor, the turn table, and the bracket to measure the flatness of the bracket or the skew angle of the spindle motor.

16. An adjusting method of an optical device, the method comprising:
directly connecting a bracket on which a stator of a spindle motor is fixed and one or more guide rods guiding a linear movement of an optical pickup to a tray body;
selecting at least three reference points relative to the one or more guide rods to set-up a reference plane including the reference points;
measuring flatness of the bracket relative to the reference plane or a skew angle of the spindle motor; and
deforming the bracket by applying an external force to the bracket until a measurement value comes within a range.

17. An optical device, comprising:
a spindle motor configured to be mounted in a turn table on which an optical disk is attached and detached;
a bracket configured to be secured with a stator of the spindle motor; and
a tray body configured to be directly connected to the bracket, wherein a skew angle of the spindle motor is adjusted by applying an external force directly to a surface of the bracket until a tilt angle of a measuring plane relative to a reference plane is within a range.

18. The optical device of claim 17, wherein
the reference plane is defined by at least three reference points selected from mutually different positions of the tray body,
the measuring plane is defined by at least three measurement points selected on mutually different positions of the turn table or by at least three measurement points selected on mutually different positions of the bracket, and
the skew angle of the spindle motor is adjusted by applying the external force, which adjusts flatness of the measuring plane relative to the reference plane or a tilt angle of the measuring plane relative to the reference plane within a range.

19. The optical device of claim 17, wherein the optical device comprises one or more guide rods coupled to the tray body to guide a linear movement of an optical pickup, wherein at least three reference points are selected relative to the one or more guide rods and a reference plane is set-up by the reference points, and the skew angle of the spindle motor relative to the reference plane is adjusted by the external force applied to the bracket.

20. The optical device of claim 17, further comprising:
one or more guide rods configured to be coupled to the tray body to guide a linear movement of an optical pickup;
a feed motor configured to be coupled to the tray body to linearly move the optical pickup; and
a lead screw configured to be operatively connected to the feed motor, wherein at least three reference points are selected relative to the guide rod or the lead screw and a reference plane is set-up by the reference points, and the skew angle of the spindle motor relative to the reference plane is adjusted by the external force applied to the bracket.

21. The optical device of claim 17, further comprising:
first and second guide rods coupled to the tray body to guide a linear movement of an optical pickup, wherein
a distal end of the first guide rod is set-up as a first reference point, the other distal end of the first guide rod is set-up as a second reference point, a center portion of the second guide rod is set-up as a third reference point, a reference plane including the first, second, and third reference points is set-up, and the skew angle of the spindle motor is adjusted by applying the external force, which adjusts flatness of the bracket relative to the reference plane or a tilt angle of the turn table within a range.

22. The optical device of claim 17, wherein the reference plane relative to the tray body is set-up, the measuring plane is determined relative to one of the turn table, a dummy disk mounted on the turn table and the bracket, and the skew angle of the spindle motor is adjusted by plastic-deforming the bracket by applying an external force until flatness of the measuring plane relative to the reference plane comes into a range.

23. The optical device of claim 17, wherein the stator is mounted on one side of the bracket and the skew angle of the spindle motor is adjusted by the external force applied to another side of the bracket.

24. The optical device of claim 23, wherein a boss protruded from a distal end of a lever depresses the other side of the bracket to apply the external force to the bracket, and the boss moves to an arbitrary position at an arbitrary height in response to linear movement and rotation movement of the lever.

* * * * *